(No Model.) 8 Sheets—Sheet 1.

T. R. COOK.
MACHINE GUN.

No. 458,268. Patented Aug. 25, 1891.

WITNESSES.
F. D. Rhodes
J Walsh

INVENTOR.
Thomas R. Cook,
by E. W. Bradford
ATTORNEYS.

THE NORRIS PETERS CO., PHOTO-LITHO., WASHINGTON, D. C.

(No Model.) 8 Sheets—Sheet 3.

T. R. COOK.
MACHINE GUN.

No. 458,268. Patented Aug. 25, 1891.

WITNESSES.
F. Dean Rhodes
J. Walsh.

INVENTOR.
Thomas R. Cook,
per E. W. Bradford.
ATTORNEYS.

THE NORRIS PETERS CO., PHOTO-LITHO., WASHINGTON, D. C.

(No Model.) 8 Sheets—Sheet 7.

T. R. COOK.
MACHINE GUN.

No. 458,268. Patented Aug. 25, 1891.

WITNESSES.
F. Dean Rhodes,
J. Walsh,

INVENTOR.
Thomas R. Cook,
per E. W. Bradford.
ATTORNEYS.

THE NORRIS PETERS CO., PHOTO-LITHO., WASHINGTON, D. C.

(No Model.) 8 Sheets—Sheet 8.
T. R. COOK.
MACHINE GUN.
No. 458,268. Patented Aug. 25, 1891.
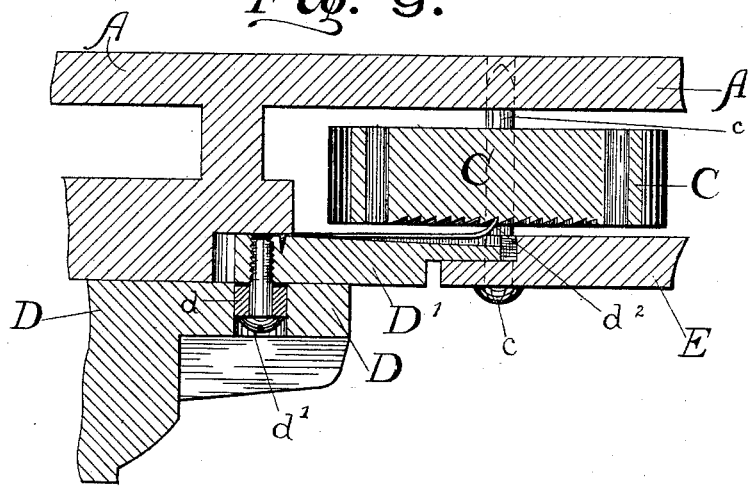
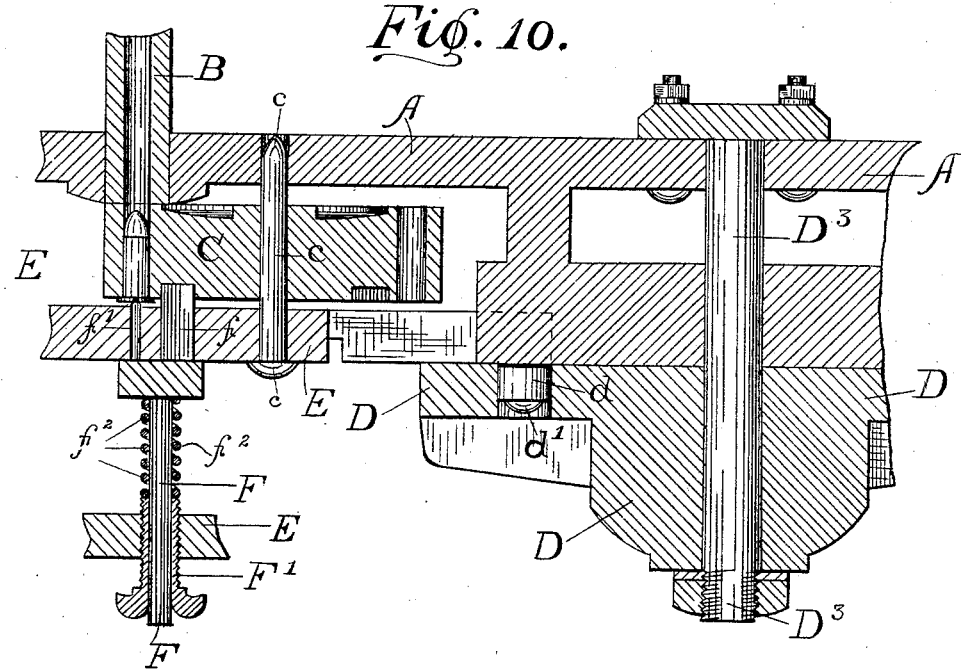

UNITED STATES PATENT OFFICE.

THOMAS R. COOK, OF NOBLESVILLE, INDIANA, ASSIGNOR OF ONE-THIRD TO HENRY M. CAYLOR, OF SAME PLACE.

MACHINE-GUN.

SPECIFICATION forming part of Letters Patent No. 458,268, dated August 25, 1891.

Application filed August 3, 1889. Serial No. 319,607. (No model.)

*To all whom it may concern:*

Be it known that I, THOMAS R. COOK, a citizen of the United States, residing at Noblesville, in the county of Hamilton and State of Indiana, have invented certain new and useful Improvements in Machine-Guns, of which the following is a specification.

The object of my said invention is to produce a machine-gun by which an unusually large number of shots can be fired within a given period.

Said invention will first be fully described, and then pointed out in the claims.

Figure 1:
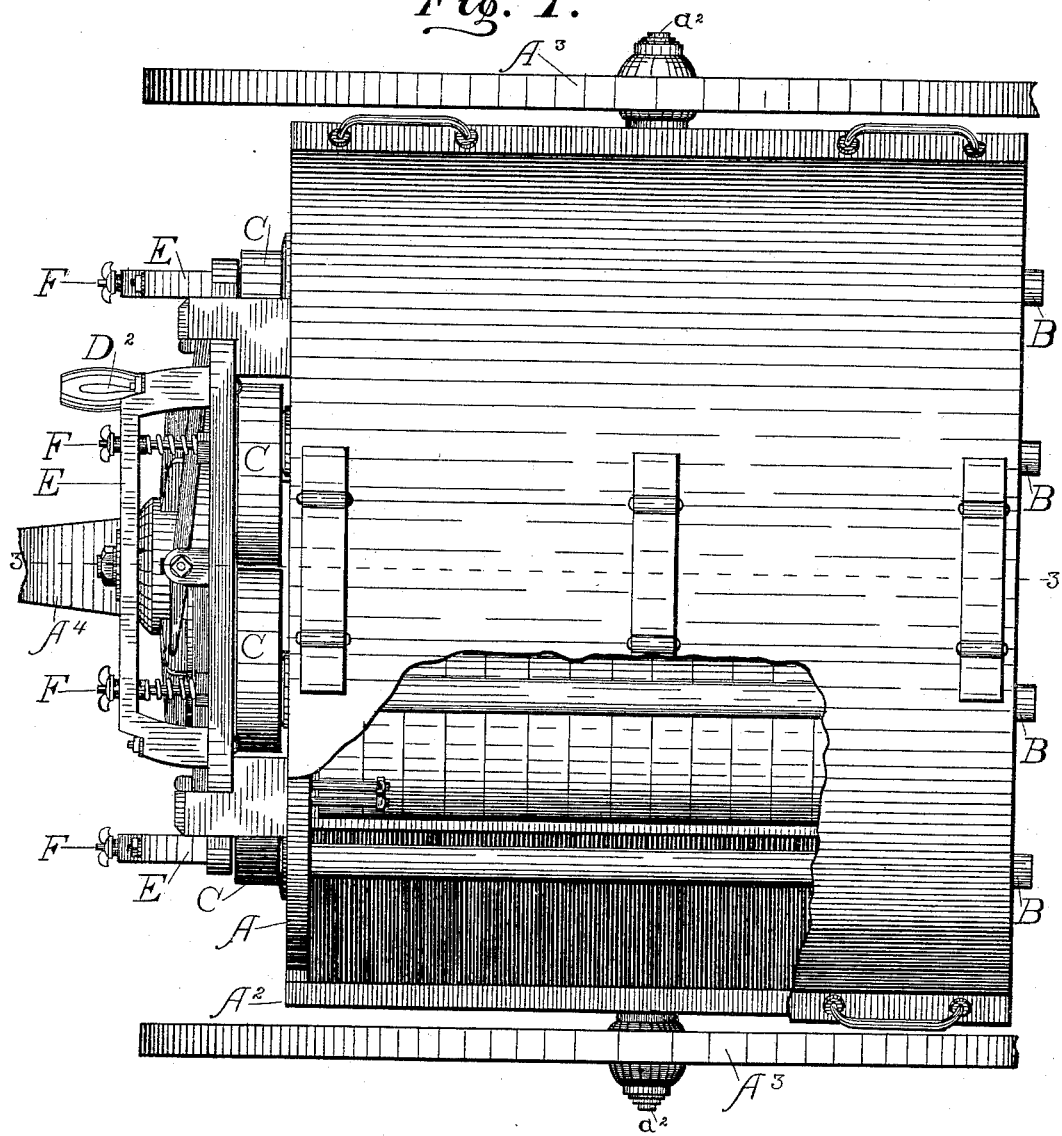
Figure 2:
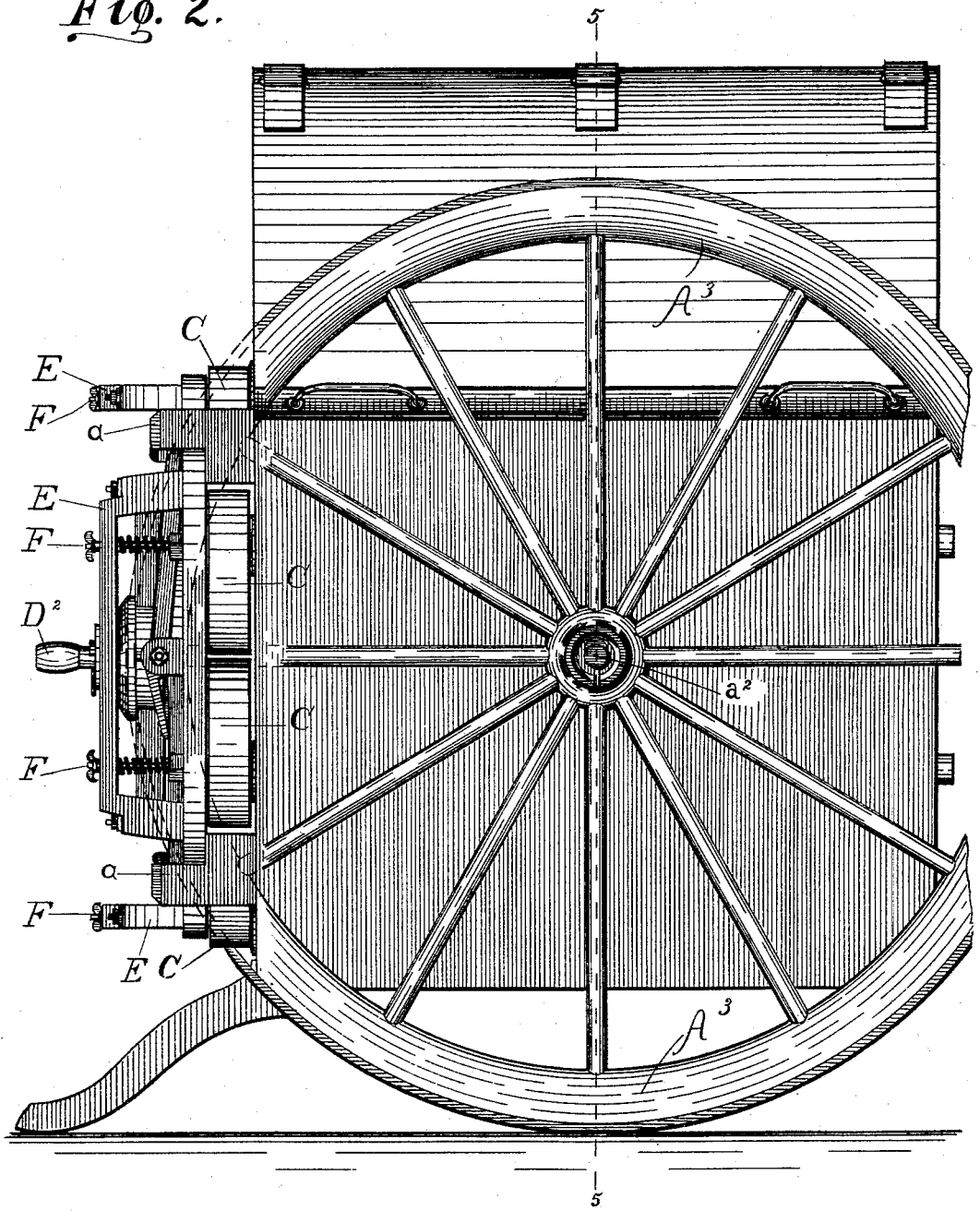
Figure 3:
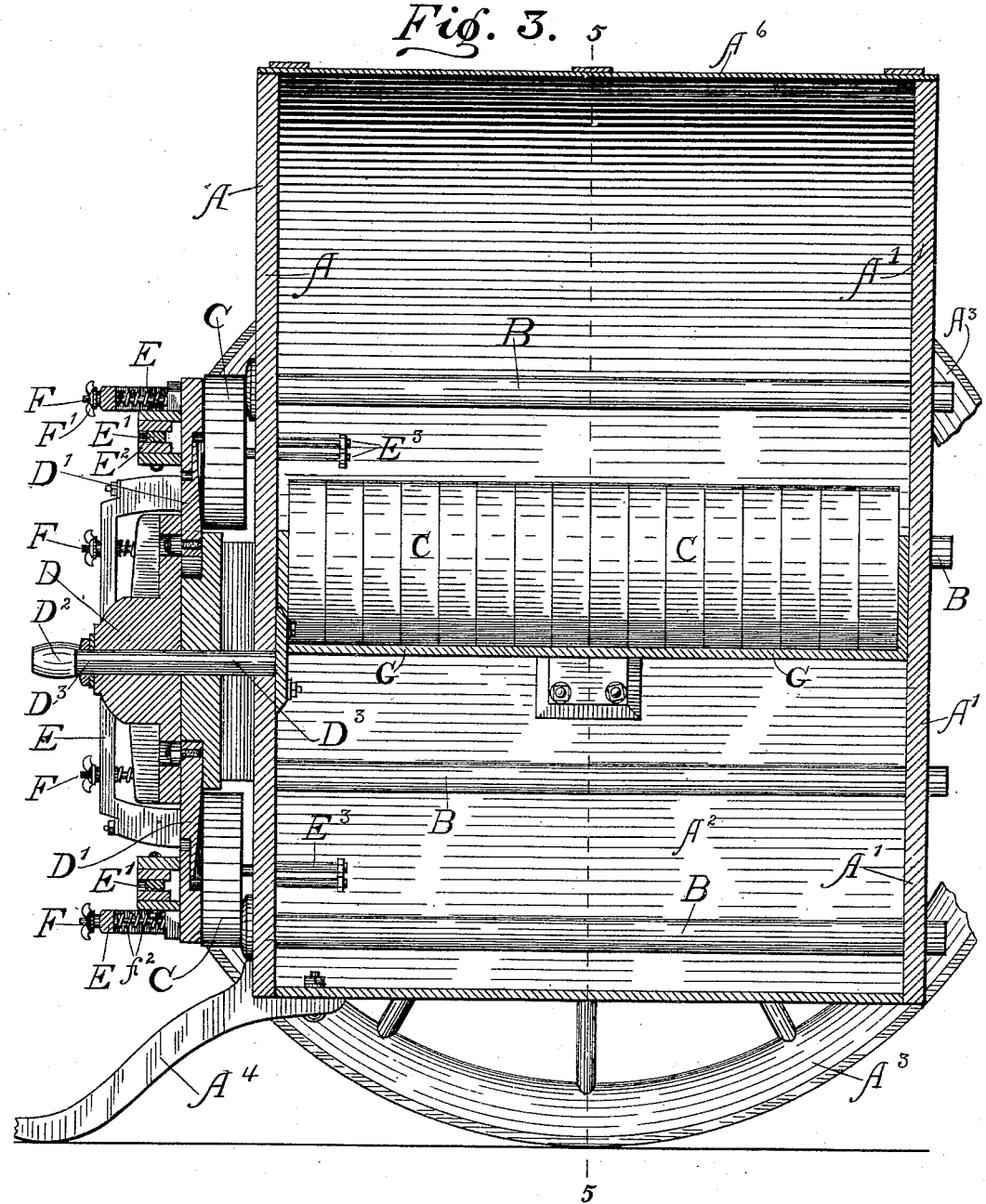
Figure 4:
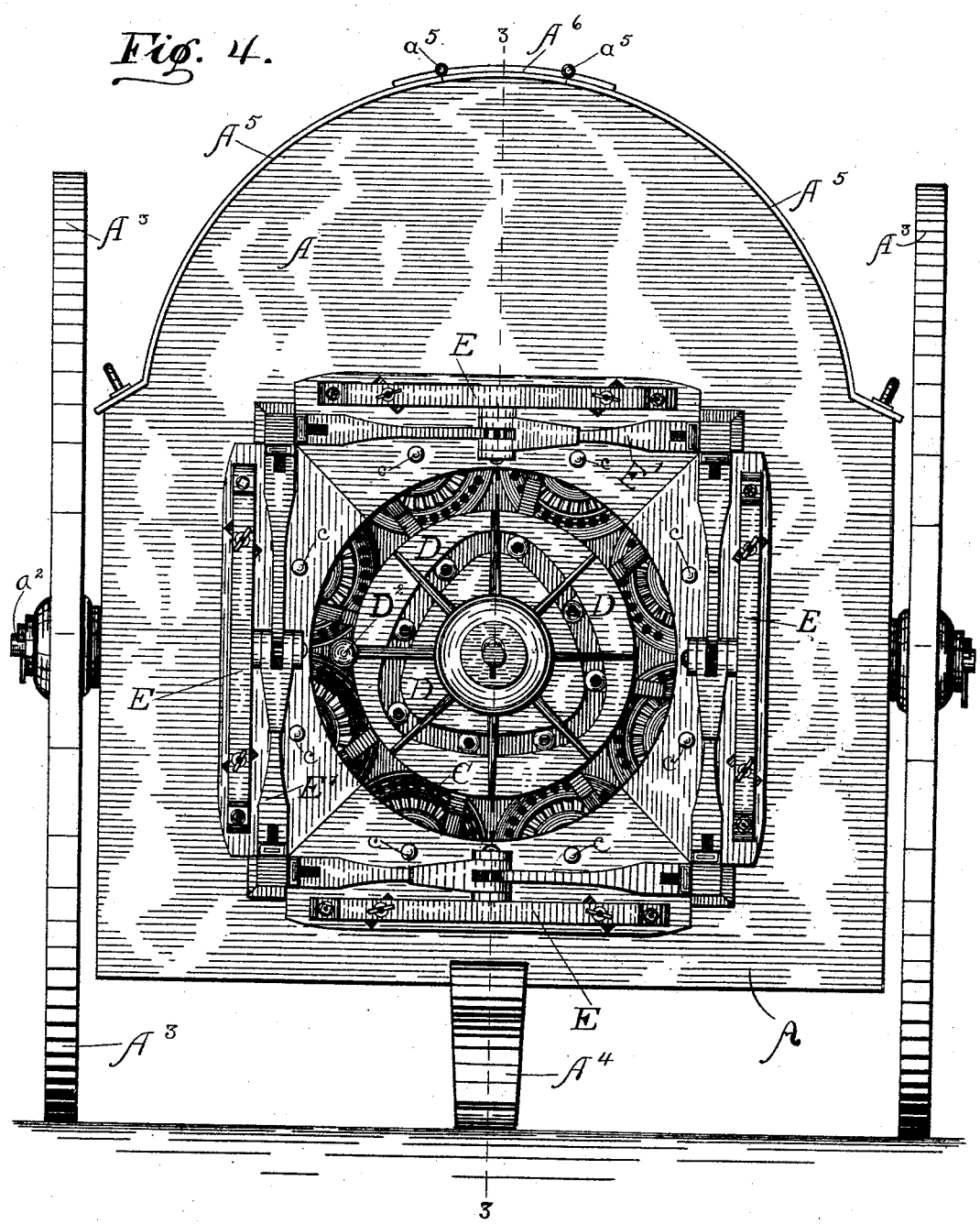
Figure 5:
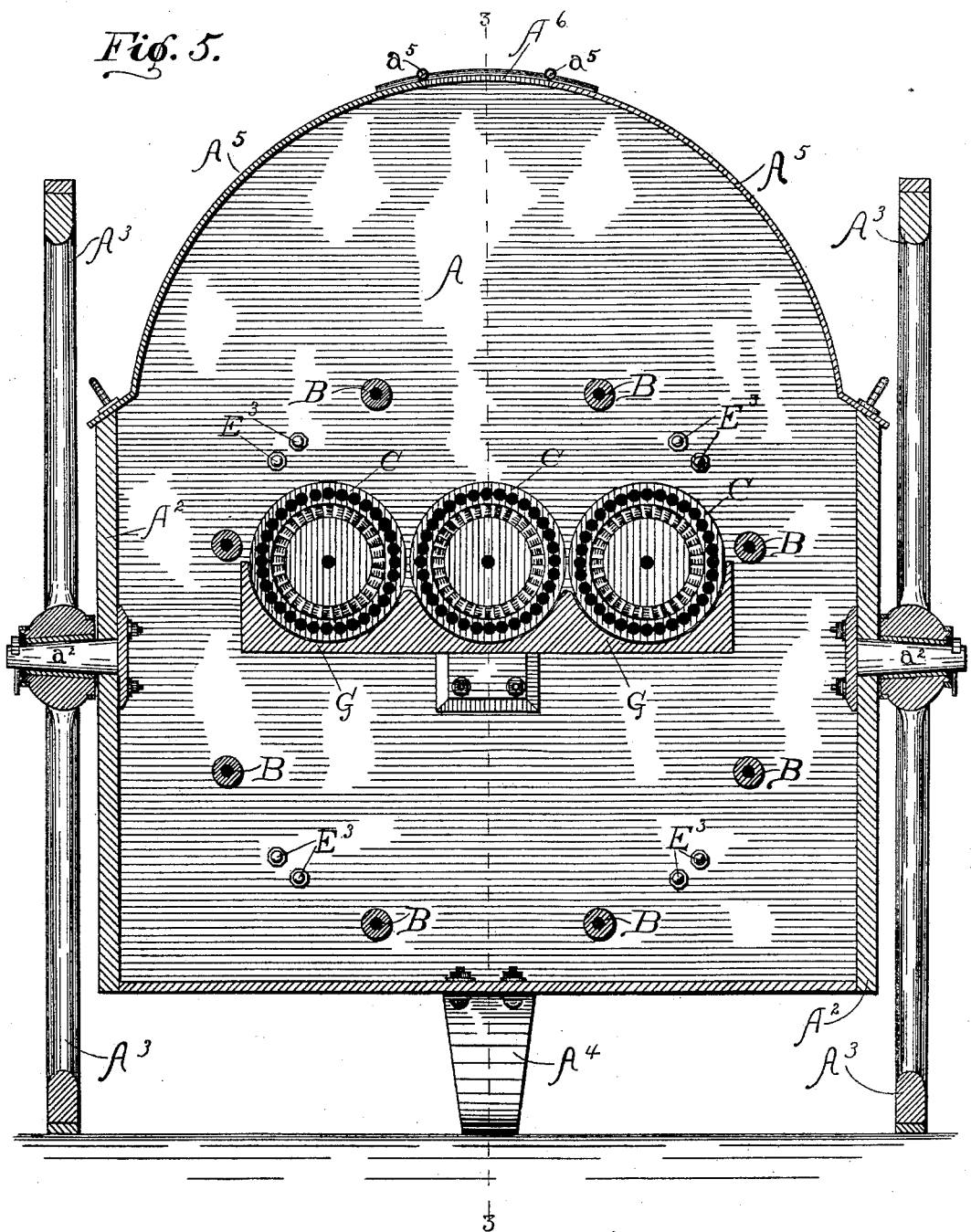
Figure 6:
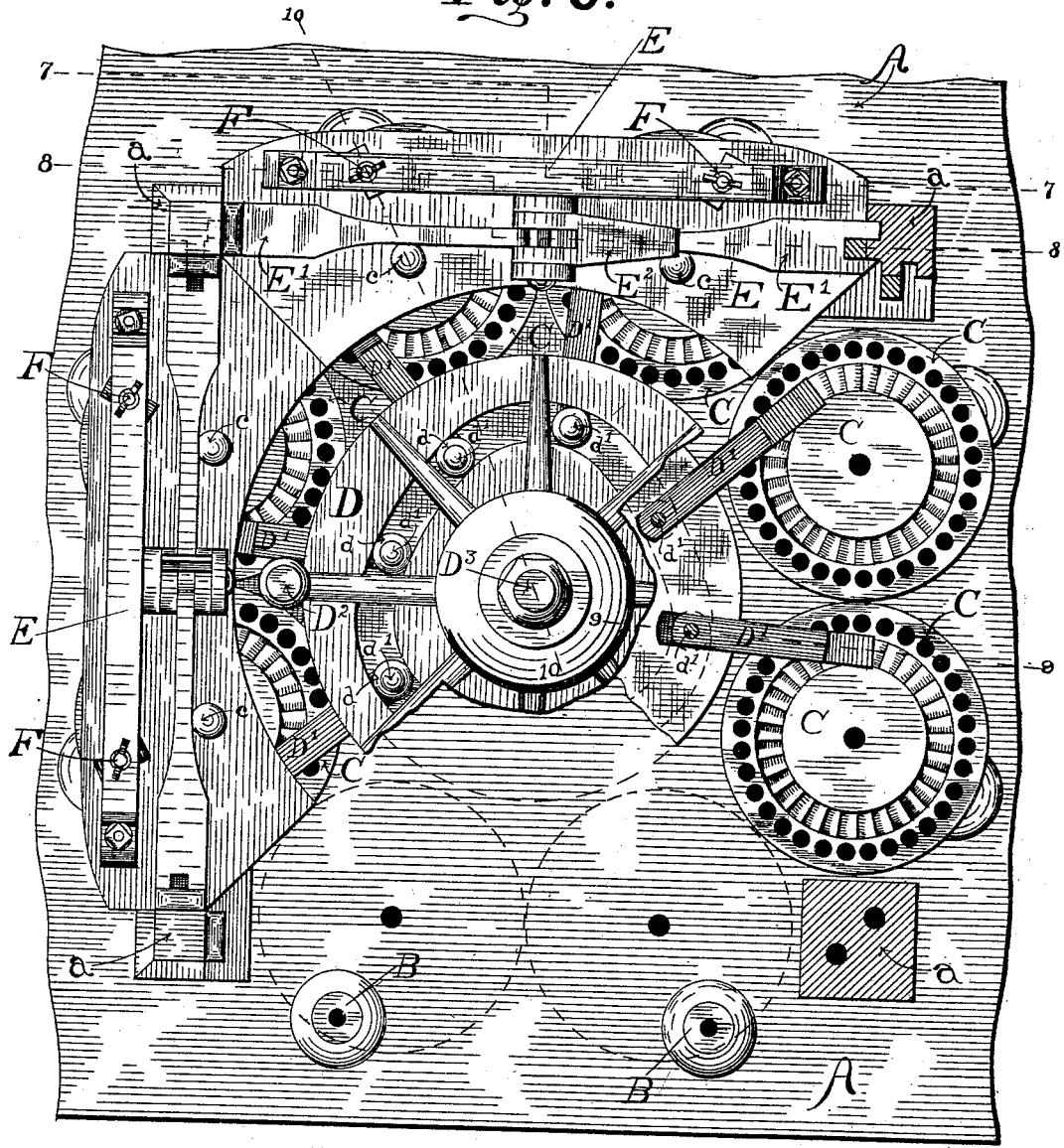
Figure 7:
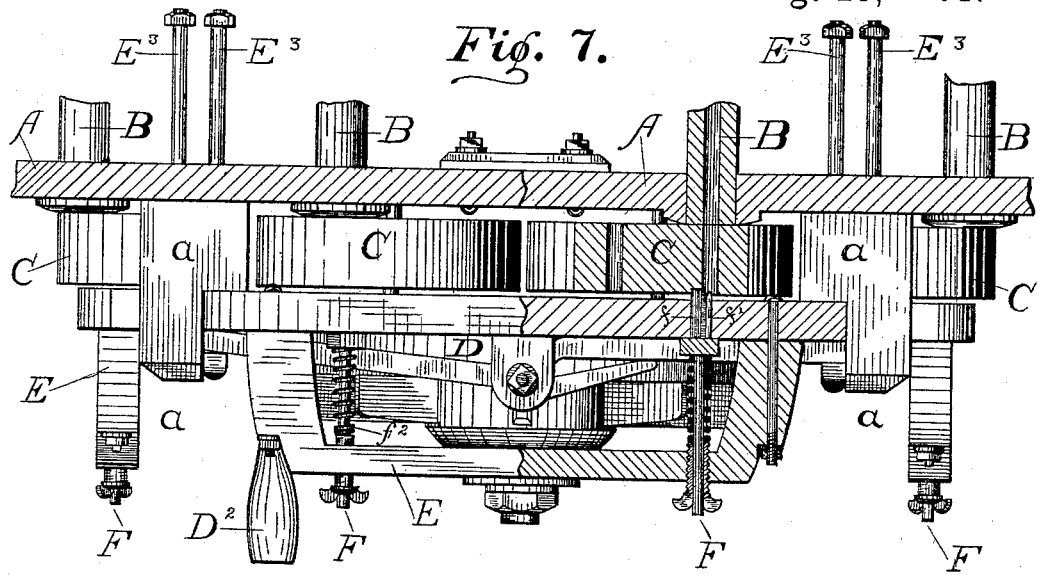
Figure 8:
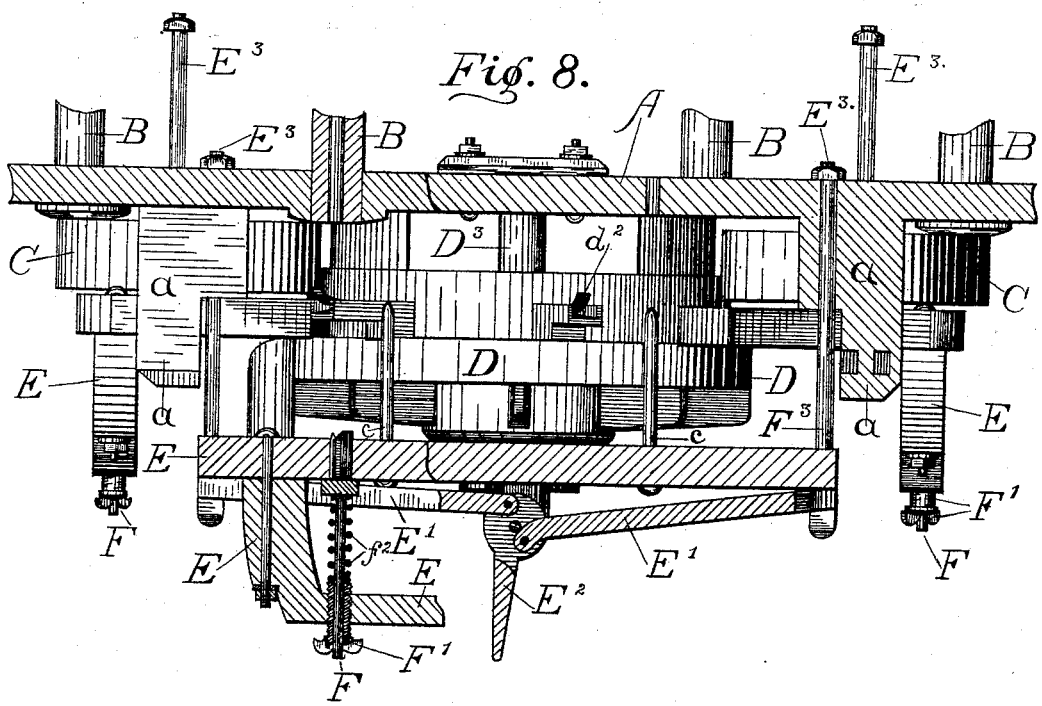

Referring to the accompanying drawings, which are made a part hereof, and on which similar letters of reference indicate similar parts, Figure 1 is a top or plan view of a gun embodying my said invention; Fig. 2, a side elevation of the same; Fig. 3, a central longitudinal vertical section on the dotted line 3 3 in Fig. 1; Fig. 4, an end elevation; Fig. 5, a transverse vertical sectional view looking toward the left from the dotted line 5 5 in Figs. 2 and 3; Fig. 6, a view similar in some respects to a portion of Fig. 4, but on an enlarged scale, and with some of the parts removed and some partly in section; Fig. 7, a detail horizontal sectional view looking downwardly from the dotted line 7 7 in Fig. 6; Fig. 8, a similar view looking downwardly from the dotted line 8 8 in Fig. 6, but with the portion E, which supports the cylinders, having its locking devices disengaged and itself partly removed from the machine; Fig. 9, a detail sectional view looking downwardly from the dotted lines 9 9 in Fig. 6 on a still further enlarged scale, and Fig. 10 a detail sectional view on the dotted line 10 10 in Fig. 6.

In said drawings the portions marked A, A', and $A^2$ represent, respectively, the back, front, and sides of the frame-work of my improved gun; B, the gun-barrels; C, the cartridge-cylinders; D, a cam-wheel by which said cylinders and the firing mechanism are operated; E, the movable frame-work by which the cylinders are held in position; F, combined detents and exploding-pins, equal in number to the cylinders, and G a magazine or caisson for holding the extra cylinders.

The frame-work consists of front and rear portions A and A', connected by side pieces $A^2$. These front and rear portions are in the form of large plates of metal, and serve also to protect the operator from injury while operating the gun, they being constructed of sufficient thickness to resist the force of bullets from any ordinary fire-arms smaller than cannon. The side pieces $A^2$ serve to connect the ends strongly together, and at a point about central to the whole machine are provided with stud-shafts $a^2$, which serve as axles for the wheels $A^3$; or a regular axle may extend through the frame. To this frame a tail-piece $A^4$ is also commonly secured. The top of the frame is preferably inclosed, and is provided with doors $A^5$, which may be raised and access to the interior thus obtained. These doors are preferably secured by hinges $a^5$ at their upper edges to a part $A^6$, which also strengthens the frame.

The barrels B are secured at equal distances apart and from a common center in the ends A and A'. There may be any number of these barrels desired within reasonable limits. I have shown eight and the necessary mechanism for operating this number.

The cartridge-cylinders C are in many respects similar to the cylinder of a revolver. Each is provided with a large number of cartridge-holes (I have shown thirty-two, which is the number I prefer) and is provided with an equal number of teeth in the form of a circular rack located just inside the row of cartridge-holes, which serve both as a rack by which to operate the cylinder and stops to hold it in position after each movement. These cylinders are each mounted on a short shaft $c$, preferably rigidly secured to the corresponding frame E, and located just far enough to one side of the corresponding barrel so that each of the cartridge-holes in the cylinder as it comes to position will just register with the hole in the barrel, similarly to the cylinder of an ordinary revolver.

The cam-wheel D is mounted on a shaft $D^3$, located centrally to all the mechanism, and has a cam-groove containing a number of cams, (three are shown,) whereby, by each revolution of said cam-wheel, as many shots are discharged from each of the cylinders as there are cams in said groove. In the construction shown, there being eight cylinders and three cams, twenty-four shots are fired at each revolution of the cam-wheel, and it may here be remarked that as it is practicable to revolve this cam-wheel twice per second a gun of the capacity shown can make about fifty shots per second, or, allowing time to change cylinders, as will be hereinafter explained, at the rate of upward of one thousand per minute.

Mounted in grooves radiating from the center in a stationary part attached to the frame portion A are pawls D', equal in number to the number of cylinders. Upon their inner ends these pawls are provided with outward projections $d'$, (which may be in the form of stud shafts or bolts,) which enter the cam-slot in the wheel D, and which are preferably provided with anti-friction rollers $d$. Upon their faces adjacent to the cartridge-cylinders are engaging points $d^2$, which are preferably formed of spring metal, and attached to the main portion of the pawl, thus permitting said pawl as a whole to move directly back and forth in the way provided for it, while the engaging points are permitted to spring somewhat, and thus in their return movement pass over the teeth of the circular rack in the cylinders C without disturbing the movement of the pawl as a whole.

It is necessary in rapid firing that there should be means of replacing the empty cartridge-cylinders with loaded ones rapidly. I have therefore provided movable holding-frames E, which carry the shafts $c$ and which are adapted to be moved back far enough to permit one set of cylinders to be removed and another inserted, while by means of a locking mechanism said frames hold said cylinders firmly to position while in use. At the corners where these frames come together are projecting portions $a$ upon the frame-work A. In the inner faces of these projections $a$ are mortises, and they are also provided with shoulders to receive the frames E. Said frames E have sliding locking-bars E', which come together in the center, where they are operated to move toward or from each other by a suitably-attached handle $E^2$. The operation, is when it is desired to withdraw one of these frames in order to permit freshly-loaded cylinders to be inserted, that this handle is thrown in one direction, as shown at the left-hand side in Fig. 6, and the points of the bars E' thus withdrawn from the mortises. The frame E is then drawn outwardly a sufficient distance to permit the cartridge-cylinders to be removed and inserted, which is done, the frame returned to position, and the handle $E^2$ turned in the other direction, (as shown most plainly at the upper side of Fig. 6,) which locks it again securely in place. Carrying-pins $E^3$, which extend through the frame A, support the frame E while drawn out, and stops upon the inner ends of these pins prevent it from being drawn too far. In placing the cylinders to position it is only necessary to put them upon the shafts $c$, which, when the frames E are forced to place, bring them exactly to the correct position. The inner ends of these shafts $c$ enter holes in the frame portion A and are supported thereby.

The combined detent and firing-pin F is mounted in appropriate bearings in the two bars of the frame E, in which bearings it is permitted to reciprocate. It has two points, one of which $f$ engages with the circular rack in the face of the cylinder C and the other of which $f'$ is in line with the center of the cartridge-opening therein when said opening registers with the opening in the barrel. A coiled spring $f^2$ surrounds the shank of this device and forces it inwardly at all times. The point $f$, which engages with the circular rack, is beveled upon one side, and is thus adapted to slip over each cog of said rack successively, and as it passes the edge of each cog it is caused to be forced suddenly forward by its spring into the notch behind said cog and in front of the next cog, where it serves as a detent to hold the cartridge-cylinder steadily to its exact position. At the same time the point $f'$, which constitutes the firing-pin, strikes the cartridge and explodes it, and thus this device is enabled to serve its double purpose. A hollow adjusting-screw F' surrounds the stem of this device, the inner end of which bears upon the spiral spring $f^2$, and thus the tension of said spring may be easily adjusted and greater or less force imparted to the device, or the spring may also be thereby relieved from tension when the gun is not in use.

The interior of the frame-work of this gun may be used as a magazine or caisson for the extra cylinders. In Fig. 5 a cross-section of a device is shown by means of which three complete rows of extra cylinders can be carried in the space that would otherwise be unoccupied. A floor G, having concave longitudinal grooves, of substantially the same curvature as the periphery of the cylinders, and with sides extending sufficiently high to insure that said cylinders shall not be thrown out, is all that is necessary for this purpose. Said floor or cylinder-support not only serves its main purpose, but also strengthens the frame-work.

The operation of my said invention is as follows: The operator turns the cam-wheel D by means of the crank-handle $D^2$ thereon, which has the effect to drive the pawls D' back and forth in their ways on the frame. The distance which they move each time is just sufficient to advance each cartridge-cylinder one notch, wheeling the succeeding cartridge into position to be exploded, which is done by the combined firing-pin and detent F. The spring which forms the pawl-point and the spring surrounding the shank of said combined detent and firing-pin hold the parts closely together, so that there is no lost motion, and each cartridge-hole is thus not only brought into position to exactly register with the hole in the corresponding gun-barrel, but is held there until the next movement of the device. A sufficient quantity of loaded cartridge-cylinders being kept on hand at all times, when the cartridges in the cylinders in the gun are exhausted it is only the work of a moment to unfasten and pull out the frames E, remove the empty cylinders and replace them with loaded ones, return the frames E to position, and go on with the firing.

As will be readily understood, a comparatively very large number of shots can be fired with this gun in a given time, as hereinbefore explained.

Having thus fully described my said invention, what I claim as new, and desire to secure by Letters Patent, is—

1. The combination, in a machine-gun, of a frame-work consisting of two large plates A and A' and side pieces connecting them, the barrels mounted at their rear and front ends, respectively, in said two large plates, and the cartridge-cylinders and mechanism for operating the same mounted upon said large plate A, substantially as shown and described.

2. The combination, in a machine-gun, of a frame-work consisting of two large plates A and A' and side pieces connecting them, and the barrels and mechanism mounted upon said frame-work, substantially as set forth.

3. The combination, in a machine-gun, of several cylinders arranged around a common center, a cam-wheel the axis of which is set centrally to the mechanism of the gun, and pawls operated by said cam-wheel to operate said cylinders, substantially as set forth.

4. The combination, in a machine-gun, of a plurality of barrels, a cylinder containing a plurality of cartridge-holes for each barrel, mechanism located centrally to said cylinders for operating the same, and a frame-work upon which the other parts are mounted, substantially as set forth.

5. The combination, in a machine-gun, of several barrels, several cylinders, a cam-wheel, and pawls mounted in ways in the frame-work radiating from the center of the mechanism and operated by said cam-wheel, substantially as set forth.

6. The combination, in a machine-gun, of several cylinders, a cam-wheel, and pawls extending from said cam-wheel to said cylinders for operating said cylinders, said cam-wheel having several cams, whereby each cylinder is operated a number of times to each revolution of said cam-wheel, substantially as set forth.

7. The combination, in a machine-gun, with the cylinders having ratchets and their pawls, of a cam-wheel D, having a slot consisting of several cams, which slot engages with projections on said pawls and thereby operates them, substantially as set forth.

8. The combination, with the cylinder of a machine-gun, of a pawl D', which engages with and operates said cylinder, said pawl consisting of a reciprocating main portion and a yielding engaging point, said engaging point being formed of spring metal, substantially as set forth.

9. The combination, in a machine-gun, with the cylinders thereof, of a movable frame carrying stud-shafts on which the cylinders are mounted and movable toward or from the main frame on pins or ways connecting them for holding said cylinders in position, whereby said cylinders may be removed and replaced with loaded ones, substantially as set forth.

10. In a machine-gun, the combination, with the cylinders thereof, of a frame E, movable toward or from the main frame-work on pins or ways provided for that purpose and having locking-bars E', substantially as set forth.

11. The combination, in a machine-gun, with removable cylinders thereto, of movable supporting-frames E, provided with carrying-pins $E^3$, upon which they are moved back and forth, said carrying-pins being supported by the frame-work, substantially as set forth.

12. The combination, in a machine-gun, with the cylinders thereto, of supporting-frames for holding said cylinders in position, pins or ways upon which said frames can be moved in and out, fixed projections on the frame-work, and locking-bars on said frames engaging with mortises or notches in said projections, substantially as set forth.

13. The combination, in a machine-gun, with the frame-work for supporting and holding the cylinders in position, of a locking mechanism consisting of two bars coming together in the center and a handle by which said bars can be simultaneously forced apart or drawn together, and the frame thus locked or unlocked, said locking mechanism being supported by said frame-work, substantially as set forth.

14. The combination, in a machine-gun, with cartridge-cylinders provided with circular racks, of a combined detent and firing-pin mounted in the frame-work behind said cylinder and provided with a spring which forces it forward, the teeth of said rack operating to force it backward as the cylinder is revolved, substantially as set forth.

15. In a machine-gun, in combination with the cartridge-cylinder having a rack, a combined detent and firing-pin mounted in the frame-work, one point of which engages with said rack, and thus serves both to hold the cartridge-cylinder in position when at rest and as a plunger by which the firing-pin is thrust back when the cylinder is revolved, substantially as set forth.

16. The combination, in a machine-gun, with the cartridge-cylinder and the frame by which the cylinder is held in place, of a combined detent and firing-pin mounted in said frame-work and operated by the rack of the cylinder as said cylinder is revolved, said rack, and a spring, substantially as set forth.

17. The combination, with a machine-gun having removable cartridge-cylinders, of a magazine or caisson within the frame-work of the gun, consisting, essentially, of a floor G, in which are grooves corresponding with the shape of the cylinders, substantially as set forth.

In witness whereof I have hereunto set my hand and seal, at Indianapolis, Indiana, this 25th day of July, A. D. 1889.

THOMAS R. COOK. [L. S.]

Witnesses:
C. BRADFORD,
J. WALSH.